United States Patent
Liu et al.

(10) Patent No.: US 7,533,087 B2
(45) Date of Patent: May 12, 2009

(54) METHOD, SYSTEM, AND PROGRAM FOR EXECUTING A QUERY HAVING A UNION ALL OPERATOR AND DATA MODIFYING OPERATIONS

(75) Inventors: Linqi Liu, Toronto (CA); Robert Paul Neugebauer, Stouffville (CA); David C. Sharpe, Oakville (CA); Nattavut Sutyanyong, Thornhill (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 10/982,367

(22) Filed: Nov. 5, 2004

(65) Prior Publication Data

US 2006/0101044 A1    May 11, 2006

(51) Int. Cl.
*G06F 17/30* (2006.01)
(52) U.S. Cl. .................. 707/4; 707/3; 707/101
(58) Field of Classification Search .............. 707/2, 707/201, 3, 4, 100, 101
See application file for complete search history.

(56) References Cited

U.S. PATENT DOCUMENTS

| | | | |
|---|---|---|---|
| 5,920,857 A | 7/1999 | Rishe et al. | |
| 6,356,892 B1 | 3/2002 | Corn et al. | |
| 6,421,658 B1 | 7/2002 | Carey et al. | |
| 6,564,204 B1 | 5/2003 | Amundsen et al. | |
| 6,581,055 B1 | 6/2003 | Ziauddin et al. | |
| 6,625,593 B1 | 9/2003 | Leung et al. | |
| 6,658,407 B1 | 12/2003 | Bailey | |
| 6,775,681 B1 * | 8/2004 | Ballamkonda et al. | ...... 707/102 |
| 6,882,993 B1 * | 4/2005 | Lawande et al. | ............... 707/2 |
| 7,127,475 B2 * | 10/2006 | Gotz et al. | ................... 707/201 |
| 2002/0198726 A1 | 12/2002 | Kiernan et al. | |
| 2002/0198872 A1 | 12/2002 | MacNicol et al. | |
| 2003/0055814 A1 | 3/2003 | Chen et al. | |
| 2003/0066033 A1 | 4/2003 | Direen, Jr. et al. | |
| 2003/0167258 A1 | 9/2003 | Koo et al. | |

OTHER PUBLICATIONS

Gupta et al., "Adapting Materialized Views After Redefinitions", 1995 ACM 0-89791-731-6/95/0005, P 211-222 [online], 1995 [retrieved on Dec. 2, 2008]. Retrieved from the Internet:< http://portal.acm.org/ft_gateway.cfm?id=223817&type=pdf&coll=ACM&dl=ACM&CFID=13046108&CFTOKEN=55705365>.*

(Continued)

*Primary Examiner*—Shahid A Alam
*Assistant Examiner*—Dennis Myint
(74) *Attorney, Agent, or Firm*—Sughrue Mion, PLLC

(57) ABSTRACT

Disclosed is a data processing system, a data processing system implemented method and an article of manufacture for executing a query having a union all operator. The data processing system implemented method directs the data processing system to execute a query against a data object. The query has a union all operator and has a set of data modifying operators. The set of data modifying operators is associated with the union all operator. The union all operator references the data object. The data processing system implemented method includes preventing the union all operator from being applied to the data object, and applying the set of data modifying operators against the data object.

14 Claims, 6 Drawing Sheets

OTHER PUBLICATIONS

Chomicki et al., "Preference Formulas in Relational Queries", ACM Transactions on Database Systems vol. 28 No. 2 P 427-466 [online], Dec. 2003 [retrieved on Dec. 2, 2008]. Retrieved from the Internet:< http://portal.acm.org/ft_gateway.cfm?id=958946&type=pdf &coll=ACM&dl=ACM&CFID=13046108 &CFTOKEN=55705365>.*

C. Zuzarte et al.: "Partitioning DB2 Using the Union All View," © International Business Machines Corporation 2002.

Y. Wang, "Processing Union and Union All Operators in Relational Data Base Accessing Systems,", IBM Technical Disclosure Bulletin, Vo. 30, No. 2, Jul. 1987.

* cited by examiner

METHOD, SYSTEM, AND PROGRAM FOR EXECUTING A QUERY HAVING A UNION ALL OPERATOR AND DATA MODIFYING OPERATIONS

FIELD OF THE INVENTION

The present invention relates to database management systems in general, and more specifically, the present invention relates to a data processing system, a data processing system implemented method and an article of manufacture for executing a query having a union all operator and data modifying operations.

BACKGROUND

Database management systems (DBMSS) are used to organize and manage large amounts of information. The data stored in databases is normally structured into records with predetermined fields. These fields identify the information in the records, and are normally organized into tables having rows and columns such that a query may be executed by a DBMS and the DBMS may generate a query response having query-satisfying information retrieved from the row(s) and column(s) associated with the tables.

A DBMS is an executable program stored on a data processing system. As is known to those skilled in the art, such a data processing system may include different hardware and software combinations. Users may access tabled information stored within a database which is operatively coupled to the DBMS by way of a user interface using, for example, a structured query language (SQL) or an XQuery and the like.

A given query may be parsed and compiled by a compiler contained within the DBMS, and as a result of compiling the given query the DBMS generates executable code which may be used for retrieving query-satisfying data which may satisfy the requirements of the given query. Typically, the DBMS may include a user command processor for processing user commands, such as queries, and executing such user commands against the database. Data processing system usable medium may contain executable code for directing the DBMS to perform algorithms related to operations of the DBMS. The data processing system usable medium may also store the database.

One way to manipulate and access a data collection stored within the database is to use a query, such as an SQL query. SQL queries may be of varying structure and complexity and may include many operators including operators that create, modify or delete data in the database.

With SQL queries, a UNION ALL operator specifies which data is to be retrieved from multiple independent sub-queries and presents a consistent set of columns and data-types to a parent operation of the SQL query. One usage of the UNION ALL operator is to combine together a large data set that has been divided into multiple smaller tables for a number of reasons including: limitations in the amount of data that can be stored in a single table; enhancing performance through reduced lock contention, disk performance, index utility and others; combining results from statistical calculations; and others. The UNION ALL operator may be used in the query to allow the parent operation to operate on a singular data object (i.e., a base table) even though data from multiple sub-queries and data objects may be retrieved. It is noted that the literature pertaining to UNION ALL operators and UNION operators identifies these operators using upper case, and it is understood that these operators may also be referred to in the lower case format.

Operators in a query language typically have one or more sources of input. When the UNION ALL operator is present in a query, it is typically one of the inputs to at least one valid operator in the query language. We refer to each of those operators which receive input from the UNION ALL operator as the parent operation. The specifics of the query language will determine what operators are valid as parent operators and what operation the parent operators will perform.

Data modifying operations, such as Update, Delete and Insert operations, require special processing when they are parent operations of a UNION ALL because the result of the data modification must be reflected in an actual data objects of the database. This requires the data modifying operator to have knowledge of the underlying structure of the UNION ALL operator and may also place restrictions on the UNION ALL operator and its sub-queries so that the data modifying operation can occur successfully. We refer to a UNION ALL operator that satisfies the requirements of an Update, Delete or Insert parent operator respectively as an Updatable, Deletable or Insertable UNION ALL operator.

A known method of directing the DBMS to process the UNION ALL operator contained in the SQL query is to process each of their sub-queries to produce their individual query results, combine those query results in a manner dictated by the UNION ALL operator, and finally flow the combined result to the parent operation. Data modifying operations must operate on data in actual data objects and determine for each tuple that is flowed from the UNION ALL operator which data object is affected. This solution is problematic because of the requirement for the data modifying operations to determine which data object it needs to operate on for every tuple.

Another known method of processing such operators is implemented outside of the DBMS by a controlling application in which the controlling application determines which data objects need to be operated thereon and instructing the DBMS on which data objects to access and/or modify and in which manner. This approach requires a great deal of complexity in the controlling application which makes the controlling application more difficult to develop and maintain. It also defeats the purpose of the UNION ALL operator, which hides the underlying structure from the controlling application, since the controlling application must now know the specification of the database design associated with the database.

There is a need for a data processing system, a data processing system implemented method and an article of manufacture for executing a query having a UNION ALL operator and data modifying operations.

SUMMARY

In an aspect, the invention provides a data processing system implemented method of directing a data processing system to execute a query against a data object, the query having a union all operator and having a set of data modifying operators, the set of data modifying operators being associated with the union all operator, the union all operator referencing the data object, the data processing system implemented method including preventing the union all operator from being applied to the data object, and applying the set of data modifying operators against the data object.

In a second aspect, the present invention provides a data processing system for executing a query against a data object, the query having a union all operator and having a set of data modifying operators, the set of data modifying operators being associated with the union all operator, the union all operator referencing the data object, the data processing system including a preventing module for preventing the union all operator from being applied to the data object, and an applying module for applying the set of data modifying operators against the data object.

In a third aspect, the present invention provides an article of manufacture for directing a data processing system to execute a query against a data object, the query having a union all operator and having a set of data modifying operators, the set of data modifying operators being associated with the union all operator, the union all operator referencing the data object, the article of manufacture including a program usable medium embodying one or more instructions executable by the data processing system, the one or more instructions including data processing system executable instructions for preventing the union all operator from being applied to the data object, and data processing system executable instructions for applying the set of data modifying operators against the data object.

BRIEF DESCRIPTION OF THE DRAWINGS

Aspects of the present invention will become more apparent from the following description of the embodiments thereof and the accompanying drawings which illustrate, by way of example, the embodiments of the present invention; in the drawings like elements feature like reference numerals and wherein individual elements bear unique alphabetical suffixes.

DETAILED DESCRIPTION

Figure 1:
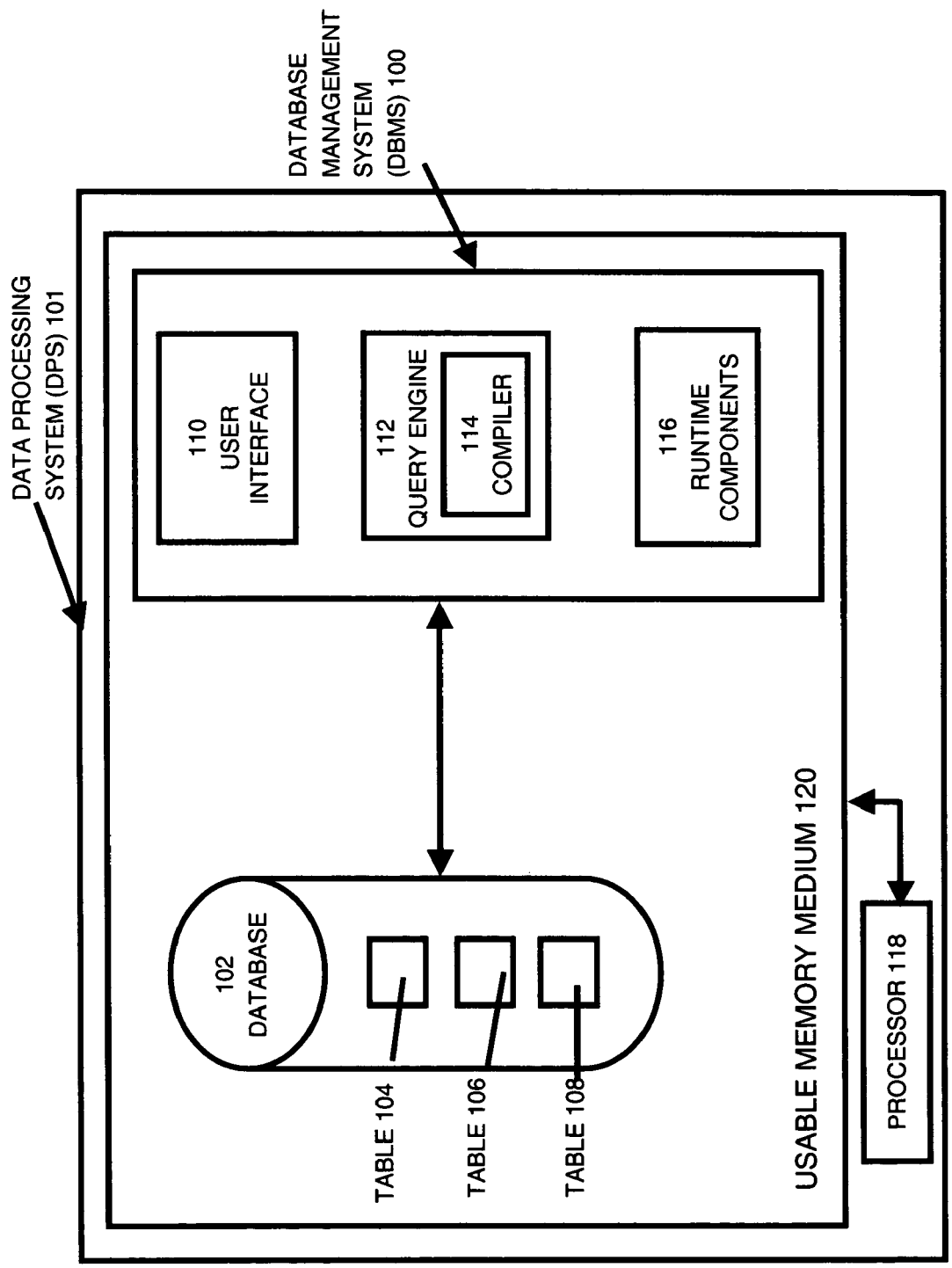
FIG. 1 shows a block diagram of a database management system (DBMS)

The description which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the OS (Operating System) provides the facilities that may support the requirements of the embodiments of the present invention. Any limitations presented may be quite likely a result of a particular type of OS, data processing system programming language, or data processing system and may not be a limitation of the embodiment of the present invention.

FIG. 1 shows a DBMS 100. The DBMS 100 is implemented as data processing system executable code stored in usable memory medium which is operatively coupled to the a data processing system (DPS) 101. Operatively coupled to the DBMS 100 is a database 102 which is also stored in the usable memory 120 associated with the DPS 101. The DPS 101 also includes a processor 118 which is operatively coupled to the usable memory medium 120. The processor 118 executes the data processing system executable code associated with the DBMS 100 and thereby achieves desired operational performance of the DBMS 100.

The DBMS 100 includes a user interface 110 which provides an access point for a user of the DBMS 100 by which the user may enter database queries (for example, SQL or XQuery queries) against information stored in the database 102. The user interface 110 may further provide an interface for providing information requested in the query to a user of the DBMS 100.

The DBMS 100 may also include a query engine 112 and runtime components 116. The query engine 112 is for processing commands received through the user interface 110, typically in the form of SQL or XQuery statements. The query engine 112 may include a compiler 114. The compiler 114 may translate query statements from the user interface 110 into data processing system usable code so that the DPS 101 in which the DBMS 100 is implemented may act or operate upon the queries. Such DPS usable instructions or code may be generated as the runtime components 116 which may then be issued against the database 102.

The processor 118 may be used, among other things, for processing the runtime components 116 and other functions of the DBMS 100.

The query engine 112 may also be responsible for optimizing the queries and generating an access plan for each such query which are then used to access the database 102.

An information collection stored within the database 102 may be organized into data objects such as a table 104, a table 106, and a table 108, so that the information may be organized in a logical manner, or to simply divide large amounts of data into smaller data objects. Information fields in the tables 104, 106 and 108 may be further organized by rows and columns. In general, data in the database 102 may be organized into data structures including rows that are index-able along one or more columns. Depending on an organization of a collection of data within database 102, it is possible for data to be duplicated within fields of different data objects, such as the tables 104, 106 or 108.

When a SQL (or a XQuery) query is issued against the DBMS 100, the query engine 112 provides an optimization function whereby SQL queries are optimized for execution in the DBMS 100 based on information known to the query engine 112. However, many SQL queries are structured with predicates that utilize data variables with values that are not known until execution of the query at runtime.

The medium 120 may include hardware, software or a combination thereof such as, for example, magnetic disks, magnetic tape, optically readable medium, semi-conductor memory, or random access memory (RAM) and the like without restriction. Furthermore the DBMS may be organized in a standalone model whereby the DBMS may be operated by a single data processing system, or may be operated in a distributed manner over a plurality of network-coupled data processing systems. Also the DBMS may be operated under a client-server model whereby one or more data processing systems that act as servers which store the database, and one or more data processing systems that act as clients which operates the DBMS. The DBMS may be operated in any combination of the above-mentioned configurations.

Figure 2:
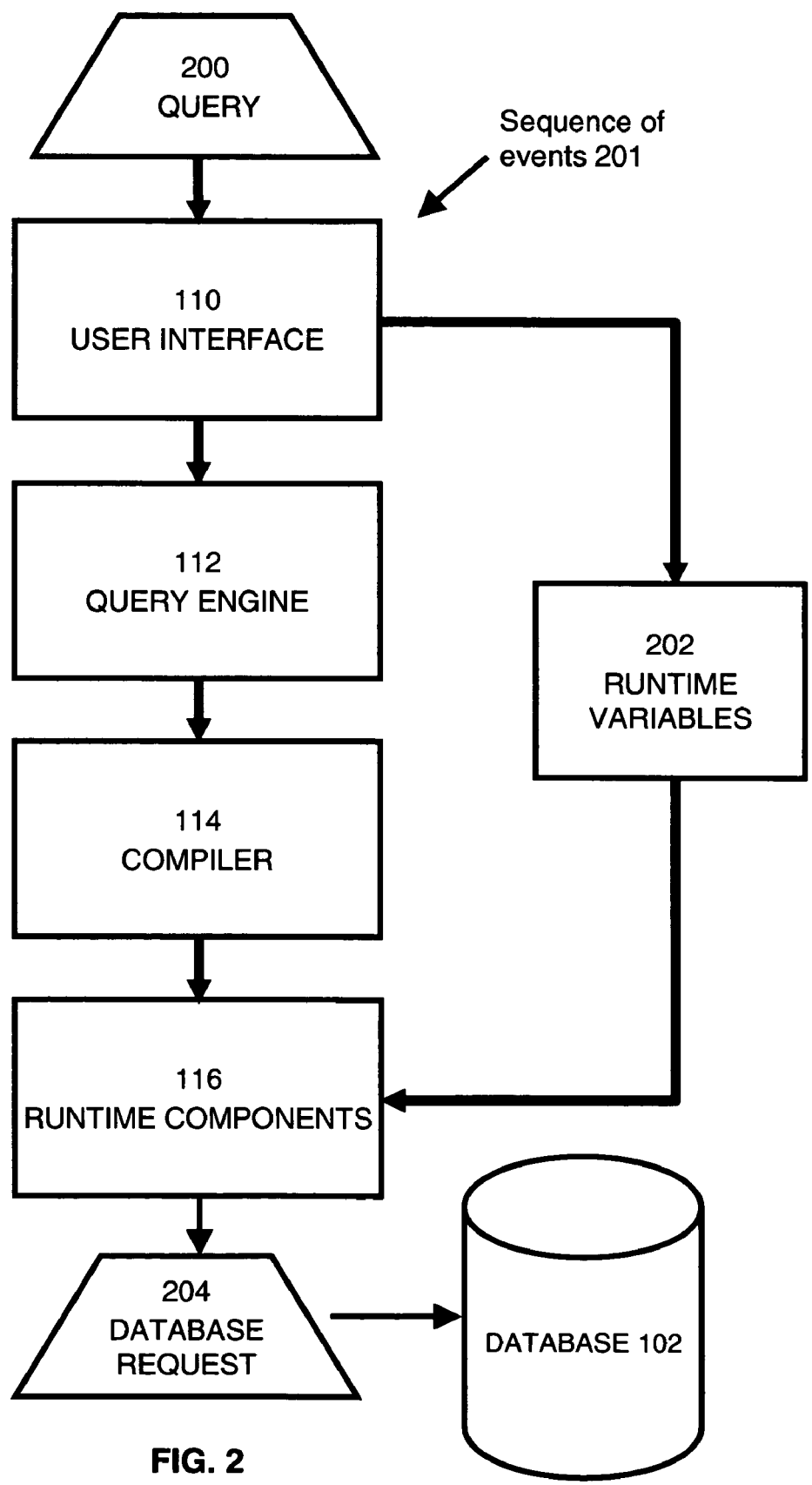
FIG. 2 shows a flow chart showing execution of an SQL query executed by the DBMS of FIG. 1.

FIG. 2 shows a sequence of events 201 following an issuance of a query 200 on the DBMS 100. After the query 200 is received by the user interface 110, the query 200 is passed to the query engine 112 for query optimization. The optimized query (not depicted) provides or generates an access plan (not depicted) that is then compiled by the compiler 114 to generate the runtime components 116. The runtime components 116 are readable by the processor 118. As the query 200 is being executed, i.e. at runtime, any data values for data variables and predicates required by the query 200 (such as, for example, the value of a host variable) would be retrieved by the processor 118 from runtime variables 202 and incorporated into the runtime components 116 by processor 118 to generate a database request 204. The database request 204 may then access the contents of the database 102 and execute the query 200 against the contents or information stored within the database 102.

The embodiment optimizes execution of operations such as the UNION ALL operator contained in the query 200. These operators allow data to be retrieved from multiple independent sub-queries or data objects, such as tables, and return a consistent set of data through the operation to a main, or parent query. For example, the UNION ALL operator may be used in conjunction with a CREATE VIEW query operator to generate a view of different data objects, such as different tables, which are glued together to appear as a single, consistent data object that may then be manipulated by further query operators. For example, a query statement:

create view X as (select * from "table 104" UNION ALL select * from "table 106");

may create a logical view entitled "X" which includes all the data records from the tables 104 and 106. The logical view "X" may then itself be operated upon by SQL queries as if it were a data object of database 102.

The nature of the UNION ALL operator is that many properties of the underlying sub-queries or data objects on which the UNION ALL operator operates are hidden from the parent operator. For example, in the view "X" created above by the query statement:

create view X as (select * from "table 104" UNION ALL select * from "table 106");

If an SQL query is executed against the view "X", such as:
select * from X;

then in the above query, the view "X" appears as if it is a single data object to the SELECT operator, even though the data produced by the view "X" is generated by a number of sub-queries comprising SELECT operations on different data objects (in this case, tables 104 and 106).

Consider if, for example, the tables 104, 106 and 108 contain information about the stock of inventory available to a firm. In this example, each of the tables 104, 106, and 108 contains a data field referred to as warehouse_id, which identifies with an integer number a particular warehouse where a particular item of stock is located, and each table is restricted to contain a limited range of warehouse_id's. Example SQL statements for creating these data objects are:

```
create table "table 104"    (warehouse_id integer
                             item_id integer,
                             num_in_stock integer,
                             num_on_order integer);
create table "table 106"    (warehouse_id integer,
                             item_id integer,
                             num_in_stock integer,
                             num_on_order integer);
create table "table 108"    (warehouse_id integer,
                             item_id integer,
                             num_in_stock integer,
                             num_on_order integer);
alter table "table 104" add constraint
        wh_chk check (warehouse_id between 1 and 100);
alter table "table 106" add constraint
        wh_chk check (warehouse_id between 101 and 200);
alter table "table 108" add constraint
        wh_chk check (warehouse_id between 201 and 300);
```

EXAMPLE 1

The case when the object STOCK is the UNION ALL operator of the data objects tables 104, 106 and 108. The SQL statement below shows how to define the object STOCK.

```
create view STOCK as select * from "table 104"
                     UNION ALL
                     select * from "table 106"
                     UNION ALL
                     select * from "table 108";
```

Figure 3:
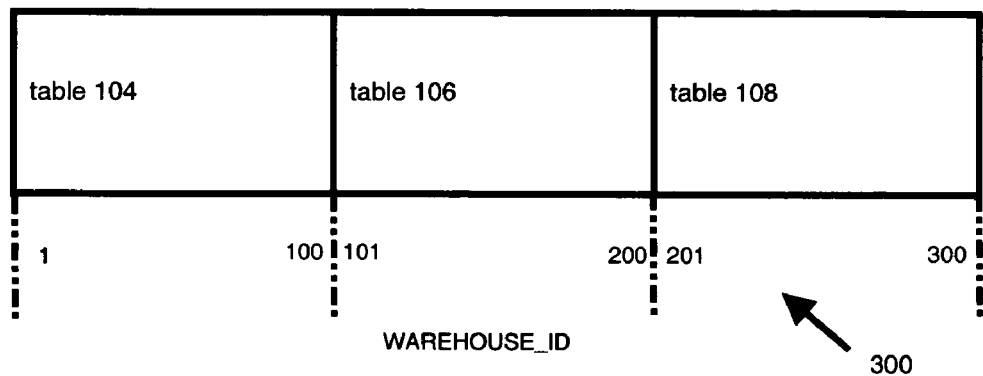
FIG. 3 shows a graphical representation of the relations between data objects being combined by a UNION ALL operator in the database associated with the DBMS of FIG. 1.

From the above SQL query statements, a number of tables will be generated in the exemplary database with a graphical representation as shown on graph 300 in FIG. 3, whereby data range constraints for each table generated is shown along the horizontal axis of graph 300.

Referring again to FIG. 3, if a parent query is executed against database 102:

```
update STOCK set num_in_stock = num_in_stock-5
        where warehouse_id = :warehouse and item_id = :item;
``` then a query optimizer (not depicted) associated with the query engine 112 could process the query by first having the UNION ALL operator access the underlying data objects contained in tables 104, 106 and 108 to first retrieve all the data in each of tables 104, 106, and 108, combine such data into a single, consistent data object, and then having the implicit parent SELECT operator filter the combined data from the underlying data objects to restrict the data according to the restrictions specified by the "where" clause. Finally the UPDATE operator could apply the changes to the data in the correct data object.

As such, it may be advantageous to have a query engine with further optimization capabilities in relation to data modifying operators in conjunction with the UNION ALL operator.

The embodiment further provides a routine for performing an analysis of the UNION ALL operator along with its input sub-queries and its parent data modifying operators prior to runtime execution of the query. The result of the analysis allows the DBMS to localize the data modifying operators to specific sub-queries of the UNION ALL operator.

One aspect of the embodiment, localization of data modifying operations, is provided. Localization of data modifying operations refer to the movement of data modifying operations, such as the SQL Update, Delete or Insert operation, closer to the data objects that will be affected by those operations. Without localization, a data modifying operator may need to be applied to the result of the UNION ALL operator, with all the data from each underlying data object being flowed up to the UNION ALL operator first, and then the data modifying operation itself deciding which data objects needs to be modified and accessing such data objects independently. This two step operation may be inefficient in operation because the UNION ALL operator abstracts the underlying data objects from the data modifying operations since it provides a single consistent data object, and as such, the data modifying operator requires additional processing to decide which data objects need to be modified before performing that operation.

Figure 4:
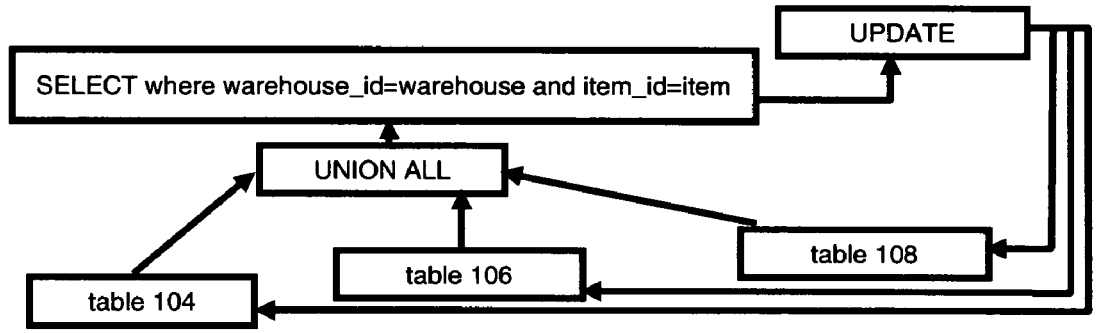
FIG. 4 shows a graphical representation of a non-localized SQL UPDATE operation upon data objects in a database associated with the DBMS of FIG. 1.

Referring to FIG. 4, a graphical representation of the following exemplary SQL UPDATE operator to be executed against the STOCK view described earlier in Example 1 is shown:

```
UPDATE STOCK set num_in_stock=num_in_stock-5 WHERE
   warehouse_id = :warehouse and item_id=:item;
```

Without localization, the data flow of such an UPDATE operator would appear as shown in FIG. 4, where data flows from each data object, tables 104, 106 and 108, of the STOCK object, which is a result of a UNION ALL operator, which then flows into an implicit SELECT operator so that appropriate data is chosen for the SQL UPDATE operator. The chosen data from the SELECT operator is then flowed to the UPDATE operator which applies the changes to the chosen data. However, the UPDATE operator must locate for each tuple the data object on which the data is stored, and then update the data for each tuple in each of the affected data objects.

With localization of data modifying operations, a routine is provided in query engine 112 of DBMS 100 to perform a "push down" of the data modifying operator closer to the underlying data objects tables 104, 106 and 108 upon which the operation must be reflected.

Figure 5:
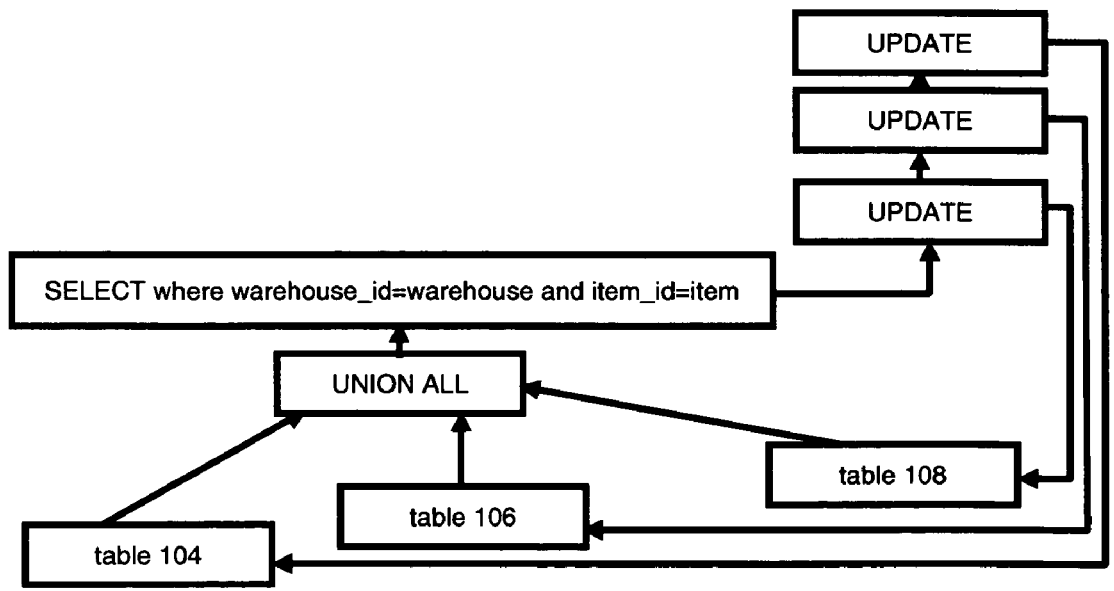
FIG. 5 shows a graphical representation of a division of the SQL UPDATE operation of FIG. 4.

Referring to FIG. 5, a graphical representation of the first step in localization is shown, whereby the Update operation is split into three separate Update statements which are to be run against each underlying data objects tables 104, 106 and 108. Constraints may have been evaluated to determine that after the UPDATE, the row will be in the same data object as it originally was.

Figure 6:
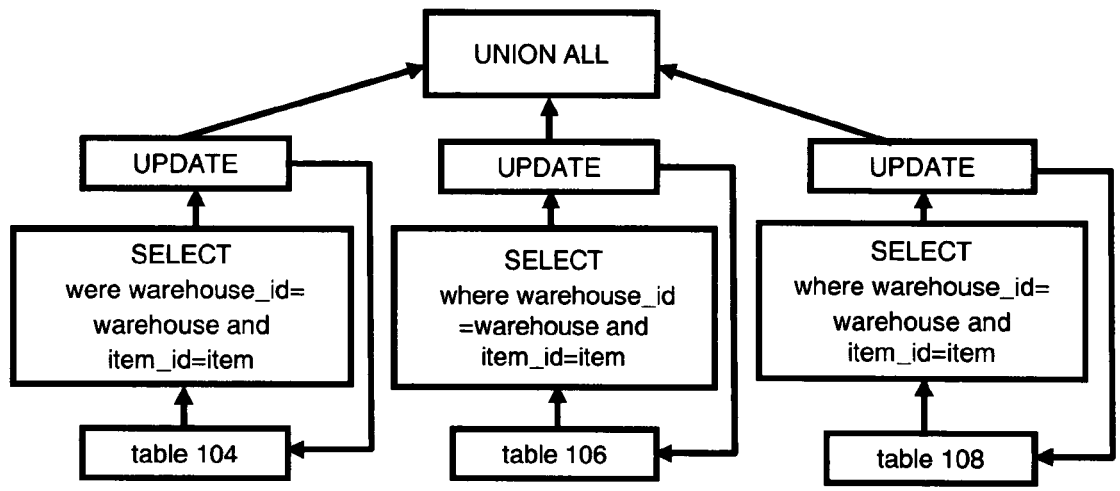
FIG. 6 shows a graphical representation of a fully localized SQL UPDATE operation of FIG. 5.

Referring to FIG. 6, a graphical representation of the second step in localization is shown, whereby the UPDATE operator and the implicit SELECT operator are pushed below the UNION ALL operator by the localization routine so that they are as close to the data objects, tables 104, 106 and 108, as possible.

Localization of the DELETE data modifying operator works essentially in the same way as an UPDATE operator as shown in FIGS. 4, 5 and 6. Localization of an INSERT operator is slightly different, as shown in FIGS. 7, 8 and 9.

Figure 7:
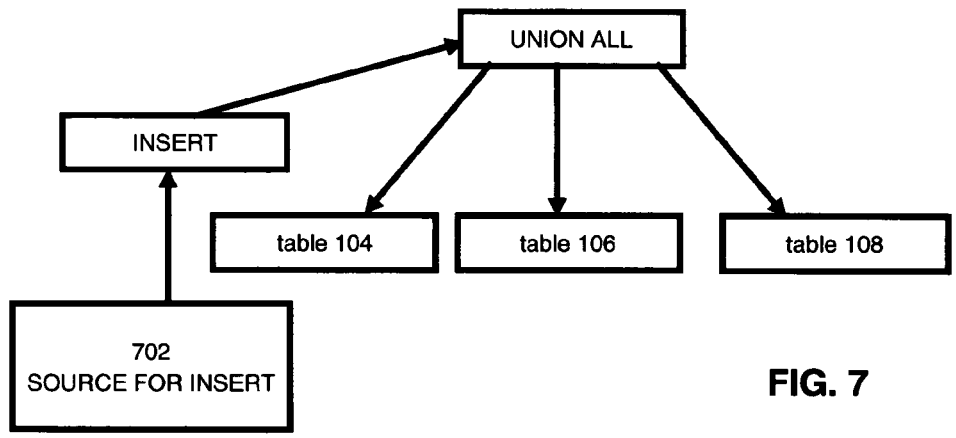
FIG. 7 shows a graphical representation of a non-localized SQL INSERT operation upon data objects in a database associated with the DBMS of FIG. 1.

Referring to FIG. 7, a graphical representation of a non-localized INSERT operator is shown, whereby the INSERT operator is shown for inserting data values into the view STOCK as created by Example 1 described above. Recall that the data object STOCK is the logical representation of a UNION ALL of the underlying data objects, tables 104, 106 and 108. Localization of the INSERT statement is essentially the same as for an UPDATE and then the DELETE operation, except that there is the addition of a source data set 702 which provides the data used by the INSERT operator for addition into the data object STOCK. Source data set 702 may be any valid sub-query in the query language, a set of literal data, or others.

Figure 8:
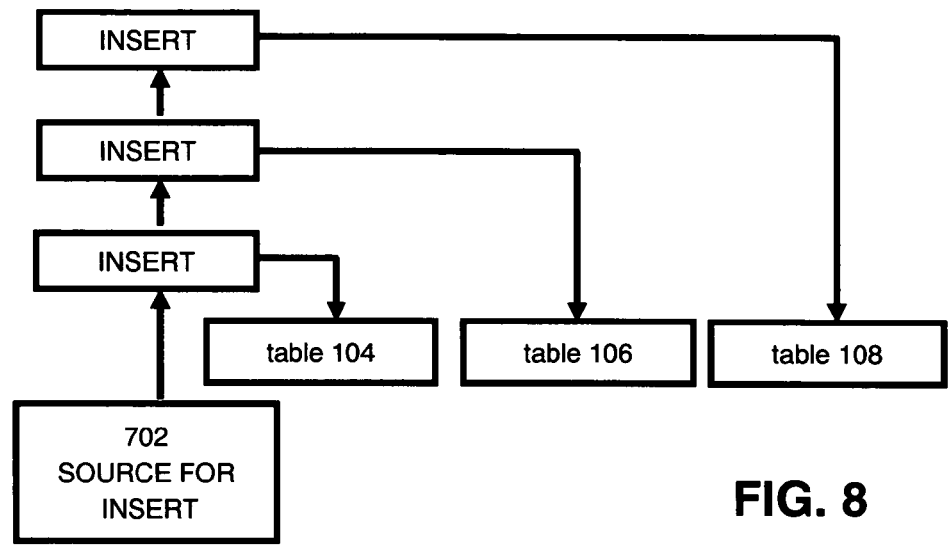
FIG. 8 shows a graphical representation of a division of the SQL INSERT operation of FIG. 7.
Figure 9:
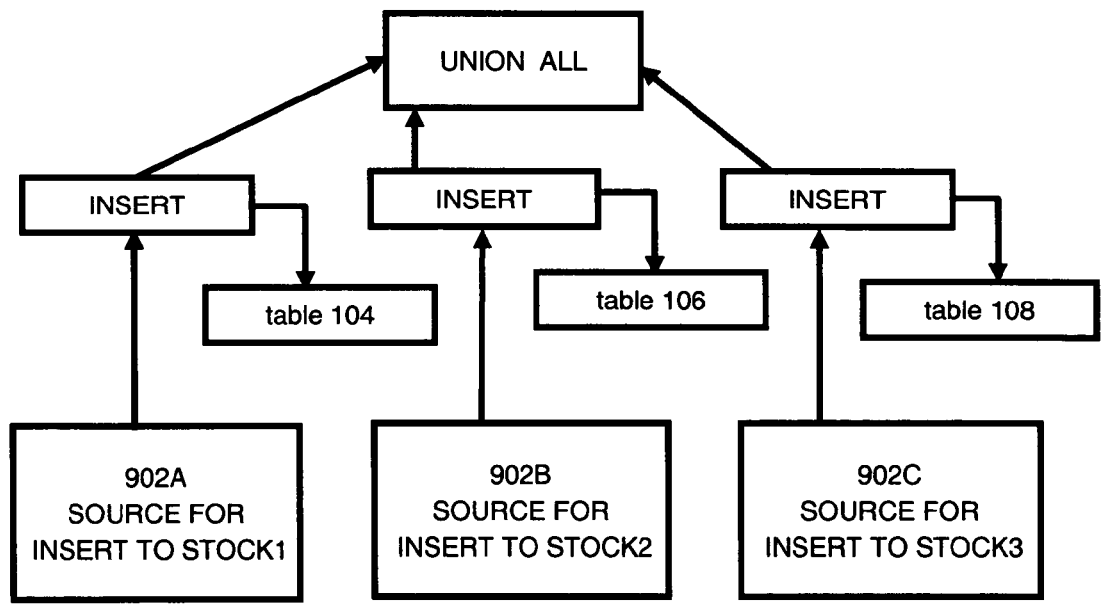
FIG. 9 shows a graphical representation of a fully localized SQL INSERT operation of FIG. 8.

Referring to FIG. 8, the INSERT operator is first, as before, divided into separate operations for each data object, tables 104, 106 and 108, that is being modified. Then, as shown in FIG. 9, each INSERT operator is pushed down below the UNION ALL operator. The source data set 702 is also divided into subsets 902a, 902b and 902c for each divided INSERT operator to insert the data into each data object.

Figure 10:
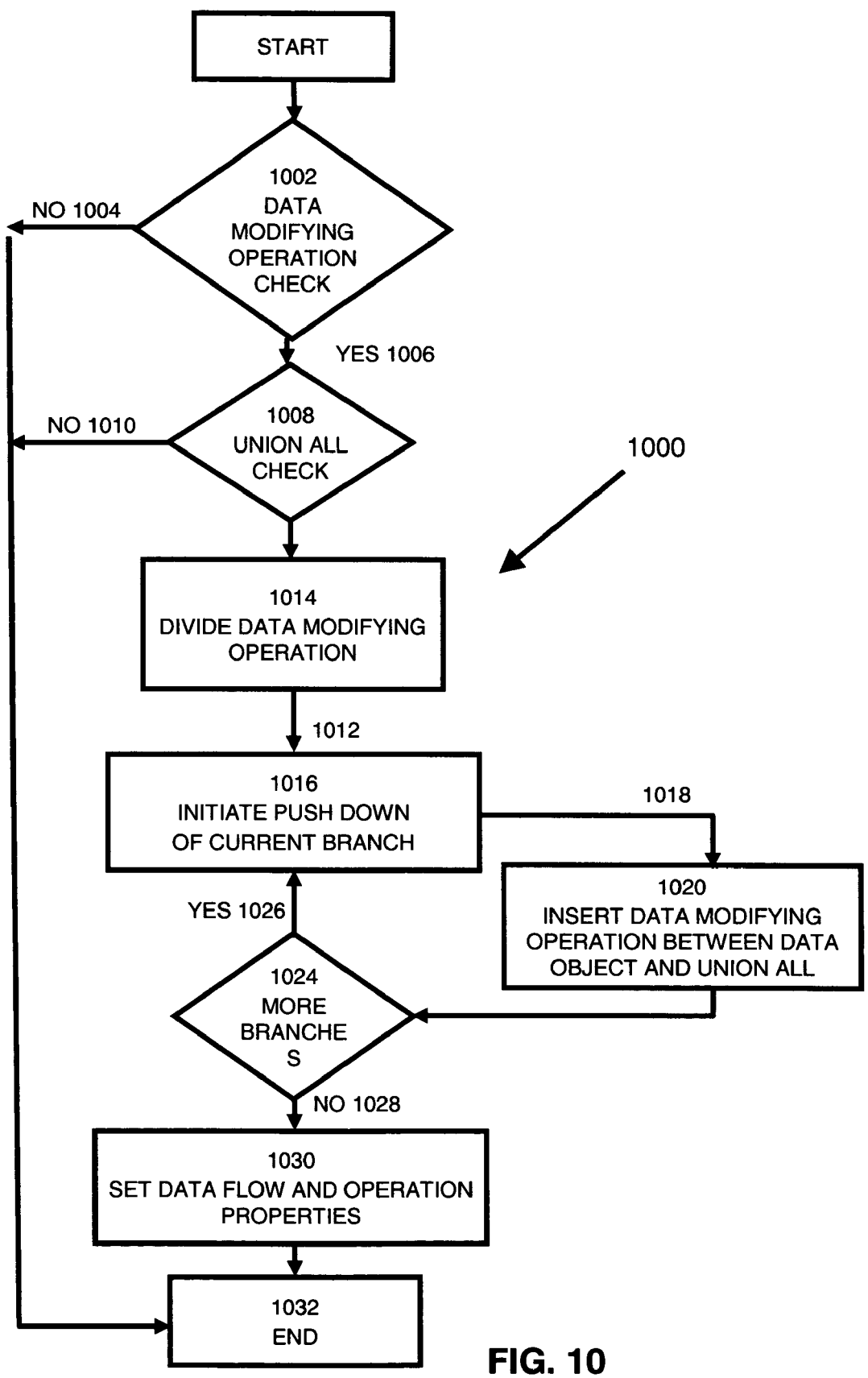
FIG. 10 shows a flow chart of a routine for localization of data modifying operations in accordance with the DBMS of FIG. 1.

A representation of the flow of a computer routine implementing the localization of data modifying operations in query engine 112 is shown in FIG. 10. Referring to flowchart 1000 of FIG. 10, the first step to be performed is to determine if a data modification operation is being requested by the query being optimized in step 1002. If not, then path 1004 is taken to end the routine at step 1032 since the SQL operation is not a data modifying operation, but if a data modifying operation is found at step 1002, then path 1006 is taken to step 1008, whereby another check is performed to determine if the data modifying operation operates upon a data object involving an Updateable, Deleteable or Insertable UNION ALL operator that corresponds to the data modifying operation. If not, then path 1010 is taken to end the routine at step 1032. Otherwise the path 1012 is taken to step 1014. At step 1014, the data modifying operation is divided into separate operations for each of the underlying data objects accessed by the UNION ALL operator, this division may entail evaluating any data restrictions present on the data objects and adding an identifier to each data object so that each divided data modifying operator can operate only on the data relevant to it. Then at step 1016, for each data modifying operation of each sub-query of the UNION ALL operator, path 1018 is taken to step 1020.

In step 1020, the data modifying operation for the sub query in question is pushed down beneath the UNION ALL operator, closer to the data object. Then at step 1024, it is evaluated whether there are additional sub-queries under the UNION ALL operator to be evaluated. If so, then path 1026 is taken to return to step 1016, but if not, then path 1028 is taken to step 1030. At step 1030, the data flow structure and operations property of the UNION ALL statement are reconfigured to reflect the new situation of the data modifying operation having been pushed down beneath the UNION ALL operator. At this point, the localization has been successfully performed and the routine ends at step 1032.

Although the invention has been described with reference to certain specific embodiments, various modifications thereof will be apparent to those skilled in the art without departing from the spirit and scope of the invention as outlined in the claims appended hereto.

The exemplary embodiments of the present invention can be written as computer programs and can be implemented in data processing systems that execute the programs using a computer readable recording medium (or a usable memory medium). Examples of the computer readable recording medium include magnetic storage media (e.g., ROM, floppy disks, hard disks, etc.). and optical recording media (e.g., CD-ROMs, or DVDs).

The invention claimed is:

1. A method of directing a data processing system to execute a query against a data object, the query having a union all operator and having a set of data modifying operators, the set of data modifying operators being associated with the union all operator, the union all operator referencing the data object, the method comprising:
   determining whether a data modification operation is being requested by the query;
   if no data modification operation is being requested, terminating operations of said method;
   if the data modification operation is being requested, determining whether the data modification operation operates upon a data object involving one of an Updateable union all operator, Deleteable union all operator and Insertable union all operator;
   if it is determined that said data modification operation does not operate upon the data object involving said one of the Updateable union all operator, Deleteable union all operator, and Insertable union all operator, terminating operations of said method;
   if it is determined that the data modification operation operates upon the data object involving said one of the Updateable union all operator, Deleteable union all operator, and Insertable union all operator:
      preventing the union all operator from being applied to the data object; and
      applying the set of data modifying operators against the data object,
      wherein the applying comprises:
         analyzing every selected update operator and every selected delete operator to determine if the source for the selected update operator and the selected delete operator comes from the data objects referenced by the UNION ALL operator,
      wherein the analyzing comprises:
         comparing an identifier added to each source row to ensure that each data object referenced by the union all operator only contains a single identifier; and
         comparing a condition in a selected data modifying operator with the identifier for all rows from particular data modifying operators referenced by the union all operator to ensure that only a single data object is the source for the selected data modifying operator.

2. The method of claim 1 wherein the set of data modifying operators comprises at least one of a delete operator, an update operator and an insert operator.

3. The method of claim 2 wherein:
   the delete operator includes the target that is a deleteable UNION ALL operator;
   the update operator includes the target that is an updateable UNION ALL operator; and
   the insert operator includes the target that is an insertable UNION ALL operator.

4. The method of claim 1 wherein the data object includes a plurality of data objects.

5. The method of claim 1 wherein the applying comprises:
   analyzing every selected update operator and every selected delete operator to determine if the source for the selected update operator and the selected delete operator comes from the data objects referenced by the UNION ALL operator.

6. The method of claim 5 wherein the analyzing comprises:
   comparing an identifier added to each source row to ensure that each data object referenced by the union all operator only contains a single identifier; and
   comparing a condition in a selected data modifying operator with the identifier for all rows from particular data modifying operators referenced by the union all operator to ensure that only a single data object is the source for the selected data modifying operator.

7. The method of claim 1 wherein the preventing the union all operator from being applied comprises:
   determining which data object is being referred to by the union all operator; and
   inserting the data modifying operator between a data operator and the union all operator.

8. An article of manufacture for directing a data processing system to execute a query against a data object, the query having a union all operator and having a set of data modifying operators, the set of data modifying operators being associated with the union all operator, the union all operator referencing the data object, the article of manufacture comprising:
   a usable memory medium embodying one or more instructions executable by the data processing system, the one or more instructions comprising:
   data processing system executable instructions for preventing the union all operator from being applied to the data object; and
   data processing system executable instructions for applying the set of data modifying operators against the data object,
   wherein a determination is made whether a data modification operation is being requested by the query;
   wherein if no data modification operation is being requested, terminating operations related to executing said query against said data object,
   wherein if the data modification operation is being requested, a determination is made whether the data modification operation operates upon a data object involving one of an Updateable union all operator, Deleteable union all operator and Insertable union all operator,
   wherein if it is determined that said data modification operation does not operate upon the data object involving said one of the Updateable union all operator, Deleteable union all operator, and Insertable union all operator, operations related to executing said query against said data object are terminated,
   wherein if it is determined that the data modification operation operates upon the data object involving said one of the Updateable union all operator, Deleteable union all operator, and Insertable union all operator:
      the union all operator is prevented from being applied to the data object; and
      the set of data modifying operators are applied against the data object,
      wherein the applying comprises:
         analyzing every selected update operator and every selected delete operator to determine if the source for the selected update operator and the selected delete operator comes from the data objects referenced by the UNION ALL operator,
      wherein the analyzing comprises:
         comparing an identifier added to each source row to ensure that each data object referenced by the union all operator only contains a single identifier; and
         comparing a condition in a selected data modifying operator with the identifier for all rows from particular data modifying operators referenced by the union all operator to ensure that only a single data object is the source for the selected data modifying operator.

9. The article of manufacture of claim 8 wherein the set of data modifying operators comprises at least one of a delete operator, an update operator and an insert operator.

10. The article of manufacture of claim 9 wherein:

the delete operator includes a target that is the the deleteable UNION ALL operator;

the update operator includes a target that is the updateable UNION ALL operator; and the insert operator includes a target that is the insertable UNION ALL operator.

11. The article of manufacture of claim 8 wherein the data object includes a plurality of data objects.

12. The article of manufacture of claim 8 wherein the data processing system executable instructions for applying comprises:

data processing system executable instructions for analyzing every selected update operator and every selected delete operator to determine if the source for the selected update operator and the selected delete operator comes from the data objects referenced by the UNION ALL operator.

13. The article of manufacture of claim 12 wherein the data processing system executable instructions for analyzing comprises:

data processing system executable instructions for comparing an identifier added to each source row to ensure that each data object referenced by the union all operator only contains a single identifier; and data processing system executable instructions for comparing a condition in a selected data modifying operator with the identifier for all rows from particular data modifying operators referenced by the union all operator to ensure that only a single data object is the source for the selected data modifying operator.

14. The article of manufacture of claim 8 wherein the data processing system executable instructions for preventing the union all operator from being applied comprises:

data processing system executable instructions for determining which data operator is being referred to by the union all operator; and data processing system executable instructions for inserting the data modifying operator between a data operator and the union all operator.

* * * * *